Figure 1:
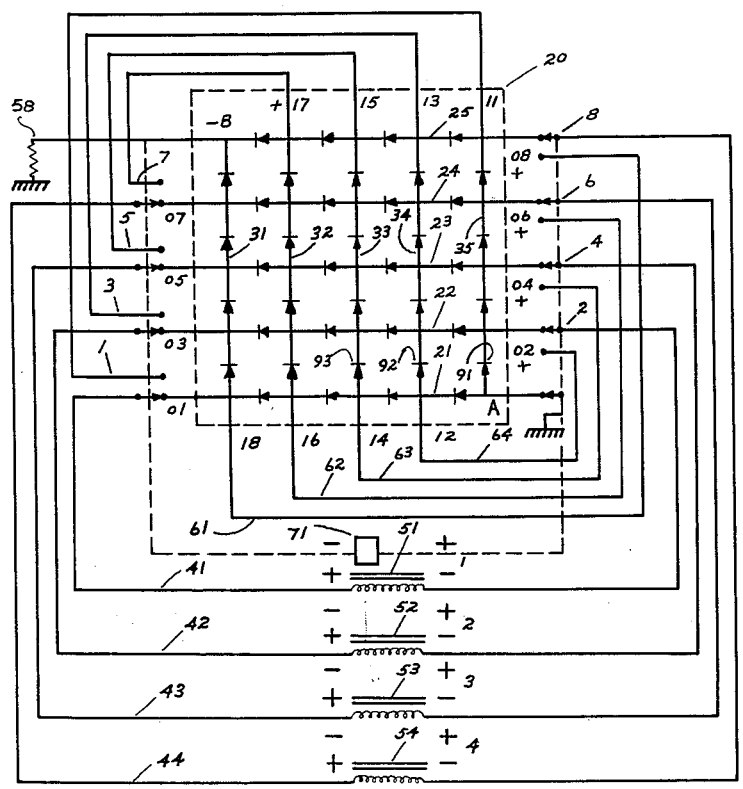

April 2, 1963 W. B. MITCHELL 3,084,326
MEANS FOR MEASURING AND TESTING COMPONENTS
Filed Dec. 1, 1958 2 Sheets-Sheet 1

INVENTOR.
WALTER B. MITCHELL
BY
EZEKIEL WOLF, WOLF & GREENFIELD

INVENTOR.
WALTER B. MITCHELL
BY
EZEKIEL WOLF WOLF & GREENFIELD

United States Patent Office 3,084,326
Patented Apr. 2, 1963

3,084,326
MEANS FOR MEASURING AND TESTING
COMPONENTS
Walter B. Mitchell, Natick, Mass., assignor, by mesne
assignments, to Transitron Electronic Corporation,
Wakefield, Mass., a corporation of Delaware
Filed Dec. 1, 1958, Ser. No. 777,468
13 Claims. (Cl. 324—158)

The present invention relates to a means and method of testing design parameters of a plurality of components or devices.

In the manufacture of various types of standard components or devices, it is often necessary to test these components or devices with respect to certain design parameters. Where the components or devices are produced in large numbers, individual testing of the components often has proved to be an expensive and time-consuming procedure. It is therefore an object of the present invention to provide a means and method of testing large numbers of components or devices simultaneously. This method is particularly adapted for use in testing components where the number of objectional components is relatively small. Fundamentally, in one conception of the present invention, a plurality of components, whether they be electrical or otherwise, are arranged in a group having an overall design parameter which is a function of the total of the individual design parameters of each component. The overall design parameter of the group of components is then measured. If there is a deviation from an expected range, it may be concluded that one or more of the components in the group is defective and the whole group may be discarded.

This system has certain limitations which must be recognized. First, as indicated, it is based upon the premise that in any given group or packet of components, the chance of a rejectable defective or failure component, is small. In addition, there must be a reasonable spread between an accepted deviation and an objectionable or failure deviation for any given component so that an objectionable or failure component will be clearly detected when testing the entire packet. Further the failure deviations must be substantially non-compensating so that two defective components will not have substantially self cancelling errors.

This method of testing has been found to be quite useful and adaptable in testing electronic components and particularly as for example, diodes and transistors. In the case of transistors, for example, a series of transistors may be connected for simultaneous measurement of design characteristics in a uniform connection between two lines with the lines each connected to different potentials. Corresponding terminals of each transistor may be connected to corresponding lines, and the third may be opened or connected to another terminal. Thus, under these conditions, the transistors in a parallel arrangement may be simultaneously tested for current between collector and base with an open emitter, or for example, current between emitter and base, with an open collector. Further applications of tests would appear clear.

A particularly useful and unique application of the present invention involves the testing of diodes for their forward voltage and inverse current characteristics after having been placed on a life-test or burn-in cycle. In this unique application of the invention, a large number of diodes divided into two groups are subjected to inverse voltages and forward currents for prolonged periods, by applying to the diodes an alternating power source with the current of the source being applied in series to alternate groups on each half cycle for applying forward current; simultaneously, the potential of the power source is applied to a parallel arrangement of the other of said groups for applying inverse voltage. The two groups may be conveniently arranged in a matrix with the two groups in fact comprising a series arrangement of packets. The matrix is particularly useful in testing diodes for not only does it permit a substantial saving in power during life testing over prolonged periods of time, but it also provides a means in which the average characteristics of the diodes in each packet arrangement may be effectively determined in a rapid fashion.

Thus, it is an object of the present invention to provide a method of testing a large number of components having a small expected number of rejects or failures by dividing the number of components into lesser groups and then treating each group as a single component to measure the average or total expected design parameter of the group.

It is also an object of the present invention to provide a means for effectively testing electrical components by arranging a group of components in a desired electrical configuration and then testing the configuration as a unit to determine deviation from the calculated desired average or total design parameters expected.

It is also an object of the present invention to provide a means by which electrical components and particularly diodes, may be life tested in an economical manner with a substantial saving in power over the many hours or weeks which it normally takes to life test such components.

A further object of the present invention is to provide a means by which a large number of diodes may be effectively tested in a convenient and expedient manner.

A further object of the present invention is to provide a matrix adapted to contain a large number of diodes for simultaneous burn-in testing and for subsequent evaluation of groups of the diodes.

A further object of the present invention is to provide a circuit adapted to be used in conjunction with a matrix for mass testing multiple terminal electrical components in an automatic fashion and then evaluate the parameters of the group of components.

Figure 2:
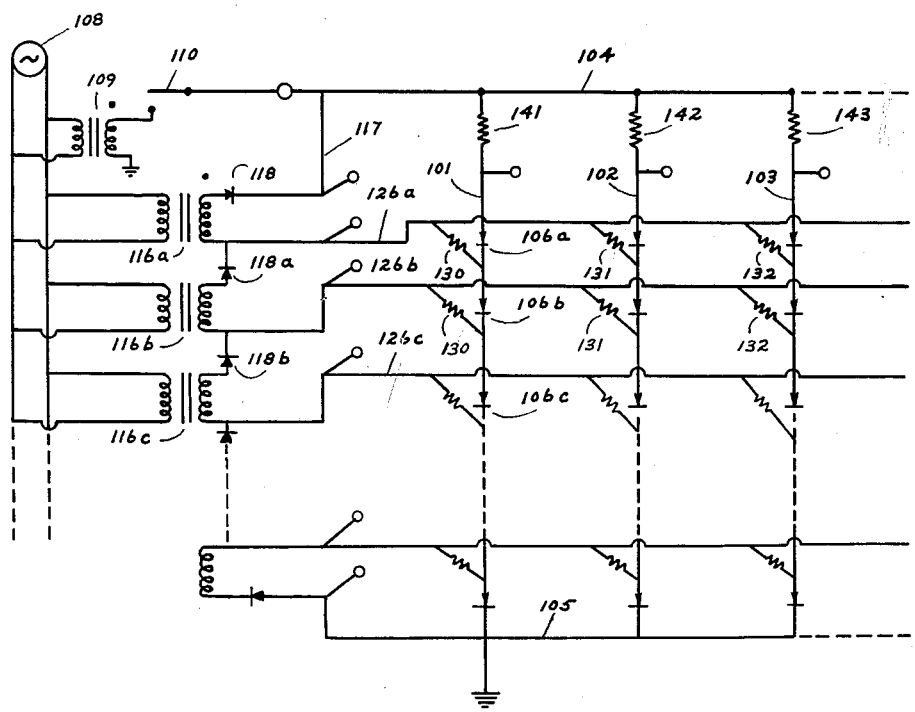

These and other objects and advantages of the present invention will be more clearly understood when considered in conjunction with the accompanying drawings in which:

FIGURE 1 is a schematic circuit diagram illustrating an embodiment of the invention for testing two terminal semi-conductor devices such as diodes, and FIGURE 2 is a further schematic circuit diagram illustrating a preferred embodiment of the invention for testing two terminal semi-conductor devices such as diodes.

The present invention will be discussed in particular detail with respect to a means and method of testing diodes. It should be understood, however, that the present invention has more widespread application than the single preferred embodiment disclosed.

As illustrated in FIGURE 1, a number of diodes are mounted on a matrix which is schematically illustrated by the block 20. In the drawing, they are illustrated as being in horizontal rows and vertical columns with the diodes within each row and each column connected in series and with the rows and columns interconnected at the cross points. Each row or column may be considered a packet or group. The schematic arrangement illustrated may be arranged in any suitable physical fashion provided an equivalent electrical lattice is formed. Thus, there is provided a matrix 20 with a series of rows 21, 22, 23, 24 and 25, each row having for example, four diodes oriented in the same direction and in series with one another. Similarly, for example, four diodes each oriented in the same direction and in series, are provided in each of the vertical columns 31, 32, 33, 34 and 35. In the horizontal rows the cathodes are to the left, while in the vertical columns the cathodes are on top. Horizontal rows 21, 22, 23, 24 and 25 have their left ends connected respectively to terminals 01, 03, 05, 07 and −B and their right ends connected respectively to terminals A, 02, 04, 06 and 08.

Lines 41, 42, 43 and 44 each having in series a power transformer respectively, 51, 52, 53 and 54 connected respectively the relay contact blade 1 to the relay contact blade 2, the relay contact blade 3 to the relay contact blade 4, the relay contact blade 5 to the relay contact blade 6, and the relay contact blade 7 to the relay contact blade 8.

When a matrix containing diodes is positioned in the circuit, the terminals 01, 02, 03, 04, 05, 06, 07 and 08 are connected respectively to corresponding terminals of the relay contacts 1, 2, 3, 4, 5, 6, 7, and 8. Terminals 11, 12, 13, 14, 15, 16, 17 and 18 are connected to the other terminals respectively of relay contacts 1, 2, 3, 4, 5, 6, 7 and 8. Terminals A and −B of the matrix are connected to a ground source with a dropping resistor 58 in series with the terminal −B with the contact blades of each relay closed to the terminal as shown. There is a circuit through the horizontal rows starting from terminal A, in which horizontal rows 21, 22, 23, 24 and 25 are in series with a transformer, respectively 51, 52, 53 and 54 interposed between each row.

When the contact blades 1—8 are connected to the other terminal of the relay, the vertical columns 31, 32, 33, 34 and 35 of diodes are connected in series with a transformer 54, 53, 52 and 51, respectively, interposed between each vertical column. Thus, starting from terminal −B, we may trace the series circuit through column 31, lines 61 to relay contact 8, line 44 to relay contact 7, terminal 17, column 32, line 62, relay contact 6, line 43, relay contact 5, terminal 15, vertical column 33, line 63, relay contact 4, line 42, relay contact 3, terminal 13, vertical column 34, line 64, relay contact 2, line 41, relay contact 1, terminal 11, vertical column 38 and finally terminal A.

In the preferred operation of this circuit, the transformers are energized uniformly and to the same magnitude by an A.C. power source. Preferably the power source should produce a sinusoidal wave form of 60 c.p.s. The relay contacts 1, 2, 3, 4, 5, 6, 7 and 8 are ganged for synchronous operation with the relay contact blades adapted to be thrown, preferably as the wave form of the power source passes through zero point. This action may be effected by any suitable means, such as a motor arrangement schematically indicated at 71, and controlled from the power source utilizing a phase shifting network.

In this operation of this circuit, we may assume that at a given instant time, the polarities of the circuit are as illustrated in the drawing. If, therefore, equal peak potentials are applied to each transformer there is a potential drop across each of the series connected horizontal rows, which, for example, may be in the range of 2 volts, assuming a half of a volt drop across each diode. Since transformers 51, 52, 53, 54 deliver the desired peak voltage minus the total forward drop of one horizontal row of diodes, we will then have a means for applying an inverse voltage to each of the diodes in the vertical columns. Thus, for example, if the voltage difference between corresponding terminals of relay contacts 1 and 3 is 48 volts, the peak voltage of transformer 51 will be 50 volts. The potential across diode 91 will be from 48 volts to zero volts, across diode 92 from 47½ volts to minus ½ volt, diode 93, 47 volts to minus 1 volt, and so on. In this manner, at that given instant of time, the diodes in the horizontal rows will be subjected to inverse voltage. When the voltage of the power source goes through zero, the means 71 causes all the contact blades in the relays to switch from the terminals to which they are illustrated as being conductively connected to the other terminals. This has the same effect as rotating the matrix containing the diodes on an axis between terminals A and B. Under these conditions, the horizontal rows are being subjected to the voltage difference between the vertical rows thereby applying an inverse voltage, while at the same time, forward current is being passed through the vertical columns. This alternating action occurs each half cycle of the A.C. power source.

Once the matrix containing the packets has been subjected to operating conditions, it is necessary to evaluate the packets to determine whether the diodes contained in the matrix have satisfactory characteristics after the test. Under such procedure, the matrix is electrically disconnected from the circuit shown. The forward voltage drop measurement of each packet is then determined by applying a selected current to each row and column, and then measuring the forward voltage drop of the diodes in series. To determine inverse leakage current, a voltage is applied between two columns. Thus, for example, the positive terminal of the test unit is connected to terminal B and the negative to terminal 16 and the sum of the inverse leakage currents of the diodes positioned between vertical columns 31 and 32 is measured. After this, the inverse leakage current characteristic measurement of the diode between vertical columns 32 and 33 is determined by connecting the positive voltage to terminal 17 and negative to terminal 14, with a similar determination being made. Under these conditions each packet may be considered as comprising a parallel arrangement of diodes. Similarly, leakage current of diodes between horizontal rows 25 and 24 may be determined by applying a positive voltage to terminal 6 and negative to terminal B. The other diodes between the horizontal rows may be likewise tested. Taking the extreme cases of a shorted diode 92, in one instance, or an open diode 92, in a second instance, we find that the tests will reveal the presence of either in the packet. In the case of a shorted diode 92, we will notice an excessive flow of current when a potential is applied between terminals 2 and 1, in testing for inverse current characteristics. On the other hand, if diode 92 is open, and a voltage potential is applied between terminals 12 and 13, there will be a substantial increase in the forward voltage drop.

It will be observed that this system may be used with any desired number of diodes in the vertical columns and also in the horizontal rows. It has been found as a practical matter, however, that ten diodes in each row and ten in each column are quite satisfactory. This arrangement, therefore, provides a system in which simple handling equipment may be utilized and in which matrices for the diodes may be efficiently arranged in stacks or the like for multiple processing of matrices.

Turning now to FIGURE 2 there is illustrated a preferred form of the invention for testing semi-conductor devices, particularly diodes. In this arrangement, a plurality of packets 101, 102, 103 . . . N are parallelly arranged between substantially equal voltage source line 104 and the ground terminal line 105. Each packet comprises a plurality of diodes 106a, 106b, 106c, etc., arranged in series with their anodes oriented towards the line 104. A voltage source 108 supplies power to the line 104 through the transformer 109. A relay contact 110 is in series connection with the line 104 and secondary of the transformer 109. This relay is adapted to switch from an open to a closed position as power from the A.C. source 108 in the transformer secondary passes through zero point. A set of transformers 116a, 116b, 116c, etc., are also connected in parallel with the transformer 109 across the power source 108. The secondaries of these transformers 116a, 116b, 116c are connected in series with one another through the line 117, between the lines 104 and the ground terminal line 105. Interposed on the line 117, between the line 104 and the secondary of transformer 116a, is a diode 118 with additional diodes 118a, 118b, etc., interposed between adjacent secondaries of the other transformers 116a, 116b, 116c, etc. All of these diodes are oriented in the same direction with the cathode toward the voltage source line 104. These diodes should be carefully designed with a very low inverse current rating and should, in any case, be better than the diodes 106a, 106b, 106c, etc., with respect to inverse leakage. If desired, a vacuum tube may be used here. Lines 126a, 126b, 126c are each connected at one terminal to line 117 with the connections being respectively between the cathodes of diodes 118a, 118b, etc., and the secondary of the transformer adjacent the cathode. Each line 126a, 126b, 126c is tapped by a plurality of equal and parallel resistors 130, 131, 132, etc., each line is connected similar to line 126a where the resistors are connected between the line 126a and the cathode side of diodes 106a. Similarly, resistors are connected from the lines 126b and 126c to the packets 101, 102, 103, etc. A series of resistors 141, 142, 143, etc., are connected in series with the packets 101, 102, 103, etc., and to the line 104.

In the operation of this modification, when an alternating voltage is applied from the source 108 and the voltage on line 104 is positive, the relay contact 110 is closed. This causes a low voltage drop between the lines 104 and 105, effecting the passage of forward current through the series arrangement of each of the packets 101, 102, 103. At the same time, the diodes 118, 118a, 118b, open effectively disconnecting the transformers 116a, 116b, 116c, etc., so that they have no effect on the circuit at this time. Under these circumstances, the resistors 141, 142 and 143 act as equalizing resistors to assure substantially equal distribution of current into each of the packets. When the voltage of transformer 109 goes negative, the relay 110 is open and the transformers 116a, 116b, 116c, etc., are coupled through the now conducting diodes 118, 118a, 118b, 118c. This causes a voltage to be applied inversely across each of the diodes 106a, 106b, 106c in each packet. Under these circumstances, the resistors 130, 131, 132, etc. act as distributing resistors. It will be noted that when forward current was applied with the relay 110 closed, they acted as isolating resistances to isolate interaction between adjacent packets. It is desirable, therefore, that the resistances 130, 131, 132 be kept small with respect to the equivalent D.C. resistance of the diode when a reverse bias is applied. When forward current is being passed, it is more desirable that these resistances be large for isolation purposes. The diodes 118, 118a, 118b act as blocking diodes which perform additional function of permitting the diodes 106a, 106b, 106c, etc., to be tested without removal of the circuit connections. All the diodes 106a are effectively a parallel packet as far as the inverse current is concerned, while diodes 106a, 106b, 106c, etc., are in series packet. This arrangement facilitates testing.

Having now described my invention, I claim:

1. A device for life testing a plurality of electrical components having two terminals comprising a matrix adapted to secure said components in a lattice of rows and columns with each row and column comprising a series of components oriented within each row and column in the same direction, said rows and columns electrically connected at their cross over points with said components intermediate each cross over point, an A.-C. power source, a plurality of transformers energized by said source, means adapted to connect said rows in series with a transformer intermediate each row, means adapted to connect said columns in series with a transformer intermediate each column and means adapted to alternate said connections.

2. A device for applying high and low voltage potentials alternately across a plurality of multiterminal electrical means forming an electrical lattice or rows and columns interconnected at crossover points with components electrically coupled intermediate adjacent points in said rows and columns, means for alternately arranging said rows and then said columns in electrical series, and means for applying a high voltage in series with said rows and columns when series arranged whereby the voltage drop across the components in series with said voltage means is low and the voltage across the other components is high.

3. A device for applying high and low voltage potentials alternately across a plurality of multiterminal electrical components comprising means forming an electrical lattice of rows and columns interconnected at crossover points with components electrically coupled intermediate adjacent points in said rows and columns, transformers, means for alternately connecting said rows in series and then said columns in series with a transformer intermediate and in series with each row when in series and intermediate and in series with each column when in series.

4. A device for applying high and low voltage potentials alternately across a plurality of multiterminal electrical components comprising means forming an electrical lattice of rows and columns interconnected at crossover points with components electrically coupled intermediate adjacent points in said rows and columns, said components uniformly oriented in said rows and columns, a plurality of relay contacts each connected to the end of a row and column with each row and column connected at each end to one of said relay contacts with said relay contacts adapted to be activated to alternately connect said rows in series and then said columns in series, transformers with each transformer intermediate and in series with each row when in series and intermediate and in series with each column when in series.

5. A device as set forth in claim 4 wherein said transformers are adapted to be uniformly energized with alternating power and means are provided to actuate said relay contacts when the voltage of said alternating power source passes through zero.

6. A device for alternately applying high and low voltage potentials in opposite polarity across a plurality of two terminal electrical components, means arranging said components in a plurality of groups with the components of each group uniformly oriented in a series arrangement, means connecting said groups in parallel between high and low terminal lines, an alternating potential source, means for applying said source across said lines when the source potential is of one sign, a plurality of transformers having secondaries connected in series across said terminal lines, said transformers each having primaries connected to said source, a plurality of intermediate lines each having parallel connections extending therefrom and connected through a resistor to points intermediate corresponding successive components in each group, and means for applying the potentials developed across each secondary to a respective pair of adjacent ones of said lines.

7. A device as set forth in claim 6 wherein said series connected secondaries are arranged with intermediate diodes uniformly oriented.

8. A method of testing a plurality of electrical elements characterized by at least first and second parameters which both must be within a prescribed range of values for an element to be considered satisfactory which method includes the steps of arranging said elements to form a configuration in which the location of each element is uniquely identified by first and second coordinate values, connecting together adjacent elements in said configuration, there being formed subcombinations of said configuration whose location is identified by a common one of said coordinate values, intercoupling said subcombinations to form a first arrangement having said first parameter value being the sum of said first parameter values of each of said elements, measuring said first arrangement first parameter value, intercoupling said subcombinations to form a second arrangement having said second parameter value being the sum of said second parameter values of each of said elements, and measuring said second arrangement second parameter value.

9. A method in accordance with claim 8 wherein said elements each comprise a semiconductor rectifying junction, said first and second coordinate values are row numbers and column numbers respectively, each row and each column of said junctions comprising respective ones of said subcombinations, said rectifying junctions in a subcombination being poled in the same sense and comprising a series combination.

10. A method in accordance with claim 9 and further comprising the steps of applying a potential of a first polarity across a said subcombination to render normal ones of said semiconductor rectifying junctions conductive and measuring the potential across said subcombination, and applying a potential of a second polarity across a said subcombination to render normal ones of said semiconductor rectifying junctions nonconductive, and measuring the current then drawn by the latter subcombination.

11. A method of testing a plurality of similar electrical elements by subjecting said elements to first and second conditions which method includes the steps of arranging said elements to form a configuration in which the location of each element is uniquely identified by a plurality of coordinate values, connecting together adjacent elements in said configuration, there being formed subcombinations of said configuration whose location is identified by a common one of said coordinate values, intercoupling said subcombinations to form a first arrangement, subjecting said first arrangement to said first condition, intercoupling the said subcombinations to form a second arrangement, and subjecting said second arrangement to said second condition, said elements each comprising at least one semiconductor rectifying junction, said coordinate values comprising a row number and column number, each row and each column of said junctions comprising respective ones of said combinations, said rectifying junctions in a subcombination being poled in the same sense and comprising a series combination, said first and second conditions being the application of forward biasing potentials and reverse biasing potentials respectively across junctions in a subcombination.

12. Testing apparatus comprising, a plurality of node terminals arranged to form a configuration in which the location of each node is uniquely identified by a plurality of coordinate values, there being formed subcombinations of said configuration whose location is identified by a common one of said coordinate values, a plurality of sources of electrical energy, means intercoupling node terminals of a subcombination in series, and selected means for alternately connecting each of said energy sources to a subcombination associated with one type of coordinate and then to a different subcombination associated with another type of coordinate, said intercoupling means comprising semiconductor rectifying junctions poled in the same sense in a respective subcombination.

13. Testing apparatus in accordance with claim 12 wherein said energy sources deliver A.-C. energy of a prescribed frequency, and further comprising means for synchronizing operation of said selective means with said frequency to change subcombination connections on each half cycle of said frequency.

References Cited in the file of this patent

UNITED STATES PATENTS

| | | |
|---|---|---|
| 1,931,877 | Samuel | Oct. 24, 1933 |
| 2,280,448 | Pfeiffer | Apr. 21, 1942 |
| 2,292,159 | Richardson | Aug. 4, 1942 |
| 2,859,384 | Kraft | Nov. 4, 1958 |
| 2,868,997 | Mitchell | Jan. 13, 1959 |
| 2,996,666 | Baker | Aug. 15, 1961 |

OTHER REFERENCES

"Automatic Functional Tester," Electronic Design, June 15, 1956, pp. 46 and 47.